(12) United States Patent
Nakaoka et al.

(10) Patent No.: US 7,810,522 B1
(45) Date of Patent: Oct. 12, 2010

(54) ACCUMULATOR

(75) Inventors: Shinya Nakaoka, Fujisawa (JP);
Kuniaki Miyake, Fujisawa (JP);
Taisuke Yamada, Fujisawa (JP);
Takeshi Watanabe, Fujisawa (JP);
Tomonari Saito, Fujisawa (JP); Eiji Mizutani, Kariya (JP); Tomoo Ogura, Kariya (JP)

(73) Assignees: NOK Corporation (JP); Advics Co., Ltd. (JP)

( * ) Notice: Subject to any disclaimer, the term of this patent is extended or adjusted under 35 U.S.C. 154(b) by 0 days.

(21) Appl. No.: 12/767,078

(22) Filed: Apr. 26, 2010

(51) Int. Cl.
*F16L 55/04* (2006.01)

(52) U.S. Cl. .................. 138/31; 138/30; 220/721; 303/87

(58) Field of Classification Search .................. 138/31, 138/30, 26; 303/87; 220/721; 417/540
See application file for complete search history.

(56) References Cited

U.S. PATENT DOCUMENTS

| | | | | |
|---|---|---|---|---|
| 2,365,994 | A * | 12/1944 | Ashton ........................ | 138/31 |
| 4,997,009 | A * | 3/1991 | Niikura et al. ................. | 138/30 |
| 6,056,013 | A * | 5/2000 | Sasaki et al. .................. | 138/31 |
| 6,789,576 | B2 * | 9/2004 | Umetsu et al. ................ | 138/30 |
| 6,805,166 | B2 * | 10/2004 | Suzuki et al. ................. | 138/31 |
| 6,810,915 | B2 * | 11/2004 | Umetsu et al. ................ | 138/31 |
| 6,871,672 | B2 * | 3/2005 | Kurokawa et al. ............. | 138/31 |
| 6,892,765 | B2 * | 5/2005 | Kamimura .................... | 138/30 |
| 6,957,669 | B2 * | 10/2005 | Suzuki et al. ................. | 138/30 |
| 7,325,571 | B2 * | 2/2008 | Shimbori et al. .............. | 138/30 |
| 7,377,292 | B2 * | 5/2008 | Mori et al. .................... | 138/30 |
| 2003/0178076 | A1 * | 9/2003 | Suzuki et al. ................. | 138/30 |
| 2005/0061379 | A1 * | 3/2005 | Mori et al. .................... | 138/31 |

FOREIGN PATENT DOCUMENTS

| | | |
|---|---|---|
| JP | 2001-336502 | 12/2001 |
| JP | 2003-278702 | 10/2003 |
| JP | 2005-315429 | 11/2005 |
| JP | 2007-187229 | 7/2007 |
| WO | WO 03/016774 | 2/2003 |

\* cited by examiner

*Primary Examiner*—Patrick F Brinson
(74) *Attorney, Agent, or Firm*—Harness, Dickey & Pierce, P.L.C.

(57) ABSTRACT

To prevent abnormal deformation of a bellows, an accumulator has a regulation mechanism for reducing a pressure difference generated when liquid sealed in a liquid chamber and charged gas are thermally expanded at a zero-down time, a seal plate is arranged in an inner peripheral side of a bellows floating end, an elastically deformable thin plate is bonded to the seal plate, an outer peripheral portion of the thin plate is bonded to the bellows floating end, the seal plate is away from a seal at a time of a steady operation, the seal plate contacts with the seal at a zero-down time, and the thin plate is elastically deformed to make liquid pressure balance with gas pressure while the seal plate being kept in contact with the seal when the liquid and gas are thermally expanded.

1 Claim, 5 Drawing Sheets

ACCUMULATOR

BACKGROUND OF THE INVENTION

1. Field of the Invention

The present invention relates to an accumulator which is used as a pressure accumulating apparatus, a pulse pressure damping apparatus or the like. The accumulator in accordance with the present invention is used, for example, in a hydraulic piping or the like in a vehicle such as a motor vehicle or the like.

2. Description of the Conventional Art

Conventionally, there has been known an accumulator structured such that a bellows is arranged in an inner portion of an accumulator housing provided with an oil port connected to a pressure piping and an internal space of the housing is comparted into a gas chamber in which a high pressure gas is charged and a liquid chamber communicating with a port hole, and the accumulator includes a type that an inner peripheral side of a bellows 51 is set to a gas chamber 55 and an outer peripheral side is set to a liquid chamber 56 by fixing the other end (a fixed end) 51b of the bellows 51 in which a bellows cap 52 is attached to one end (a floating end) 51a to an end cover 54 on an upper portion of a housing 53 as shown in FIG. 8 (which is called as "inside gas type" since the gas chamber 55 is set to the inner peripheral side of the bellows 51, refer to Japanese Unexamined Patent Publication No. 2005-315429.), and a type that the outer peripheral side of the bellows 51 is set to the gas chamber 55 and the inner peripheral side is set to the liquid chamber 56 by fixing the other end (the fixed end) 51b in which the bellows cap 52 is attached to one end (the floating end) 51a to an oil port 57 in a lower portion of the housing 53 as shown in FIG. 9 (which is called as "outside gas type" since the gas chamber 55 is set to the outer peripheral side of the bellows 51, refer to Japanese Unexamined Patent Publication No. 2001-336502 or Japanese Unexamined Patent Publication No. 2007-187229).

In this case, in the accumulator connected to a pressure piping of a device, a liquid (an oil) is discharged little by little from a port hole 58 if an operation of the device is stopped, and in the outside gas type accumulator in FIG. 9 mentioned above, the bellows 51 is contracted little by little accordingly by the charged gas pressure, a seal 59 provided on a lower surface of the bellows cap 52 comes into contact with the other member 60 so as to come to a so-called zero-down state. Further, in this zero-down state, since a part of the liquid is sealed within the liquid chamber 56 (a space between the bellows 51 and the seal 59) by the seal 59, and pressure of the sealed liquid balances with the gas pressure of the gas chamber 55, it is possible to inhibit excessive force from being applied to the bellows 51 so as to generate an abnormal deformation.

However, in the case that the zero-down due to the operation stop is carried out at a low temperature, and the temperature rises in this state, the liquid sealed in the liquid chamber 56 and the charged gas are thermally expanded respectively, and the respective pressures rise. In this case, a rising rate of the pressure is higher in the liquid than in the charged gas, however, since a pressure receiving area in the bellows cap 52 is set smaller than the charged gas, the bellows cap 52 does not move until the liquid pressure becomes considerably higher than the gas pressure. Accordingly, there is a case that a great pressure difference coming to about some MPa is generated between the liquid pressure and the gas pressure in the inner and outer sides of the bellows 51, and if the great pressure difference is generated, there is a risk that the bellows 51 is abnormally deformed or the seal 59 is damaged.

Further, since an accumulator shown in FIG. 10 is an outside gas type accumulator similarly to the accumulator in FIG. 9, and has a peculiar structure that an auxiliary liquid chamber 71 is provided in an inner peripheral side of the bellows 51, and a piston 72 with a piston seal 73 is inserted into the auxiliary liquid chamber 71 so as to make a stroke motion, the following disadvantages are pointed out (refer to Japanese Unexamined Patent Publication No. 2003-278702).

(i) An expansion of the bellows 51 can be carried out only within a range of a volumetric capacity of the auxiliary liquid chamber 71 (a contraction of the bellows 51 is limited if the volumetric capacity of the auxiliary liquid chamber 71 is increased, and a liquid amount for expanding the bellows 51 becomes small if the chamber 71 is made small, so that it is impossible to increase an amount of expansion).

(ii) Since the piston makes a stroke motion in a state in which the piston 72 is sealed with the piston seal 73, slip resistance due to seal surface pressure is great, and a motion of the bellows 51 slows down correspondingly to a loss thereof (a function as the accumulator is lowered).

Further, in Japanese National Publication of Translated Version No. 2005-500487, there is disclosed an accumulator structured such that a secondary piston is coupled to a bellows cap via a secondary bellows, however, the following disadvantage is pointed out in this conventional art.

(iii) Since a constraction of the bellows is generated in a state in which the secondary bellows is expanded at a time of zero-down, and the constraction of the bellows stops at the stage that the secondary piston reaches the lowest surface, it is impossible to secure a sufficient expansion and contraction stroke of the bellows.

SUMMARY OF THE INVENTION

Problem to be Solved by the Invention

The present invention is made by taking the points mentioned above into consideration, and an object of the present invention is to provide an outside gas type accumulator in which the accumulator is provided with a mechanism for reducing a pressure difference generated at a time when a liquid sealed in a liquid chamber and a charged gas are thermally expanded at a time of zero-down, whereby it is made possible to inhibit a bellows from being abnormally deformed, by reduction of a pressure difference between inner and outer sides of the bellows.

Means for Solving the Problem

In order to achieve the object mentioned above, in accordance with the present invention, there is provided an accumulator including an accumulator housing provided with an oil port connected to a pressure piping, and a bellows arranged in an inner portion of the housing to compart an internal space of the housing into a gas chamber in which a high pressure gas is charged and a liquid chamber communicating with a port hole, a fixed end of the bellows being fixed to the oil port so as to set an outer peripheral side of the bellows to the gas chamber and to set an inner peripheral side thereof to the liquid chamber, and an inner surface of the oil port being provided with a seal for closing the liquid chamber at a time of zero-down so as to seal a part of the liquid in the liquid chamber, wherein the accumulator has a pressure difference regulation mechanism for reducing a pressure difference generated at a time when the liquid sealed in the liquid chamber and the charged gas are thermally expanded at a time of zero-down, i.e. when the liquid within the liquid chamber is discharged through the port hole and the seal plate comes into contact with the seal, wherein the regulation mechanism is structured such that a seal plate is arranged in an inner peripheral side of a floating end of the bellows, an elastically deformable thin plate is bonded to a surface at the gas chamber side of the seal plate, an outer peripheral portion of the thin plate is bonded to the floating end of the bellows, the seal plate and the floating end of the bellows are made relatively displaceable in a bellows expanding and contracting direction in a range in which the thin plate is elastically deformed, and a distance in a radial direction from an outer peripheral edge portion of the seal plate to the thin plate bonded portion is set to be larger than a distance in a radial direction from an outer peripheral edge portion of the seal plate to a seal contact portion, i.e. a portion where the seal plate comes into contact with the seal, in a state in which the seal plate comes into contact with the seal at a time of zero-down, and wherein the seal plate is away from the seal in a state in which it is held to the bellows and the thin plate at a time of a steady operation, the seal plate comes into contact with the seal at a time of zero-down, and the thin plate is elastically deformed to a state in which liquid pressure balances with gas pressure while the seal plate being kept in contact with the seal at a time when the liquid and the charged gas are thermally expanded.

In the present invention having the structure mentioned above, since the fixed end of the bellows is fixed to the oil port so as to set the outer peripheral side of the bellows to the gas chamber and to set the inner peripheral side thereof to the liquid chamber, the accumulator in accordance with the present invention is the outside gas type accumulator. Further, to the floating end of the bellows, there are attached the thin plate and the seal plate constructing the pressure difference regulation mechanism in place of the conventional bellows cap.

Further, the accumulator in accordance with the present invention operates as follows.

Steady Operation Time

Since the seal plate stays away from the seal in a state in which it is held by the bellows and the thin plate, the port hole and the liquid chamber (the space between the bellows and the seal) communicate. Accordingly, since the liquid provided with pressure each time is introduced freely from the port hole to the liquid chamber, the thin plate and the seal plate move while expanding and contracting the bellows in such a manner that the liquid pressure balances with the gas pressure.

Zero-Down Time

If the operation of the device stops, the liquid within the liquid chamber is discharged little by little from the port hole, the thin plate and the seal plate move in a bellows contracting direction, and the seal plate comes into contact with the seal. If the seal plate comes into contact with the seal, the liquid chamber (the space between the bellows and the seal) is closed, and a part of the liquid is sealed in the liquid chamber. Accordingly, any further pressure reduction is not generated, and the liquid pressure therefore balances with the gas pressure inside and outside the bellows.

Thermal Expansion Time in Zero-Down State

If the liquid sealed in the liquid chamber and the charged gas are thermally expanded due to the rise of the temperature of the ambient atmosphere or the like, in the zero-down state, that is, the state in which the seal plate comes into contact with the seal, the pressure difference is generated since the rising degree of the pressure is higher in the liquid than in the gas. In this case, in the present invention, since the pressure difference regulation mechanism is actuated, that is, the thin plate is elastically deformed to the state in which the liquid pressure balances with the gas pressure, the pressure difference is lowered. Accordingly, since it is possible to inhibit the great pressure difference from being generated between the inner and outer sides of the bellows, it is possible to prevent the abnormal deformation from being generated in the bellows due to the pressure difference.

In this case, since the seal plate is set in such a manner that the distance in the radial direction from the outer peripheral edge portion of the seal plate to the thin plate bonded portion is larger than the distance in the radial direction from the outer peripheral edge portion of the seal plate to the seal contact portion in the state in which it is in contact with the seal, at a time of thermal expansion, it does not come away from the seal while keeping in contact with the seal. This is because the pressure receiving area in the bellows contracting direction generated by the distance in the radial direction from the outer peripheral edge portion of the seal plate to the thin plate bonded portion is set to be greater than the pressure receiving area in the bellows expanding direction generated by the distance in the radial direction from the outer peripheral edge portion of the seal plate to the seal contact portion. Accordingly, the seal plate does not move while being in contact with the seal, and only the thin plate is elastically deformed. If the thin plate is elastically deformed, there is a case that the floating end of the bellows moves in the bellows expanding direction in accordance with this. The seal plate comes away from the seal due to a fluctuation of the pressure receiving area, the elasticity of the thin plate or the like, at a time when the zero-down is dissolved.

EFFECT OF THE INVENTION

Therefore, in accordance with the accumulator of the present invention which operates as mentioned above, since it is possible to reduce the pressure difference generated at a time when the liquid sealed in the liquid chamber and the charged gas are thermally expanded at a time of zero-down, in the outside gas type accumulator, it is possible to reduce the pressure difference between the inner and outer sides of the bellows, and it is possible to prevent the bellows from being abnormally deformed. Accordingly, it is possible to improve a durability of the bellows and thus the accumulator. Further, since the auxiliary liquid chamber and the secondary bellows as mentioned above are not provided, it is possible to dissolve the disadvantages (i), (ii) and (iii) mentioned above.

DETAILED DESCRIPTION OF PREFERRED EMBODIMENT

The present invention includes the following embodiments.

A disc (the seal plate) coming into contact with the seal is bonded to a thin disc (the thin plate) bonded to an end portion (the floating end) of the bellows at an axial center portion, floats up from the oil port in a state in which the liquid pressure is applied (a normal operation), and does not come into contact with the seal provided in the oil port. At a time of zero-down, the disc comes into contact with the seal so as to come to the state in which it is pressed against the oil port, however, in the case that the liquid in the inner portion of the bellow is thermally expanded, the thin disc is deformed so as to absorb the expanded volume of the liquid, so that any excessive deformation is not generated in the bellows. In order to make the thin disc be more easily deformed and reduce stress acting on the bonded portion to the disc, the bent portion may be provided on the circumference of the thin disc.

Embodiment

Next, a description will be given of an embodiment in accordance with the present invention with reference to the accompanying drawings.

Figure 1:
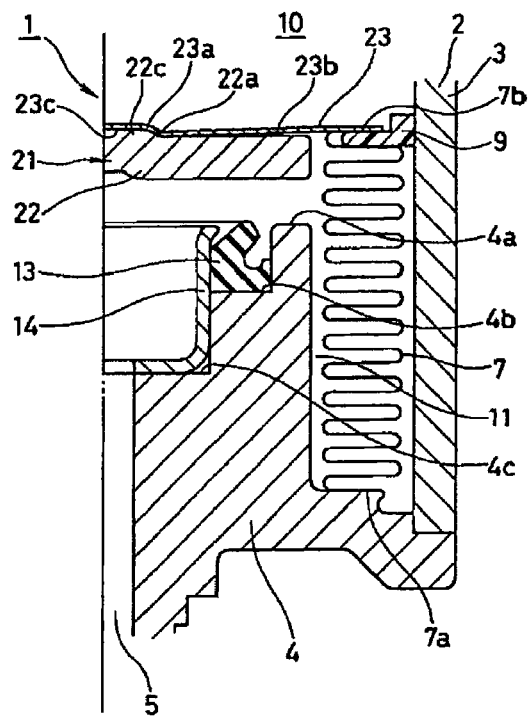
FIG. 1 is a sectional view of a substantial part showing a state at a steady operation time of an accumulator in accordance with an embodiment of the present invention.
Figure 2:
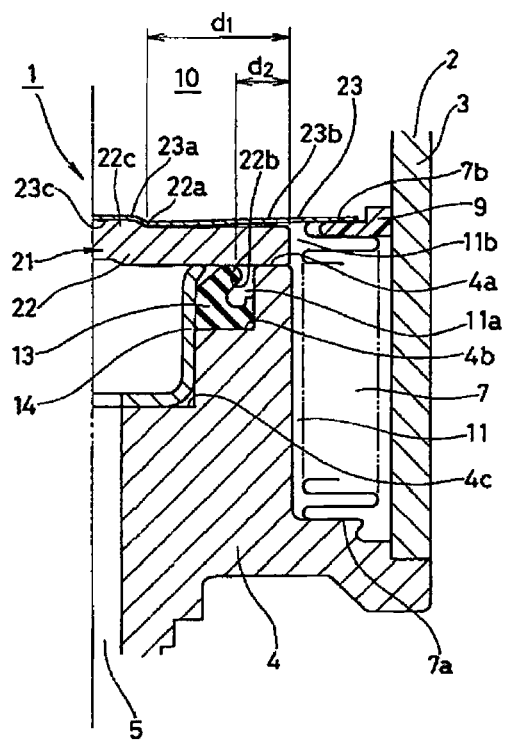
FIG. 2 is a sectional view of a substantial part showing a state at a zero-down time of the accumulator.
Figure 3:
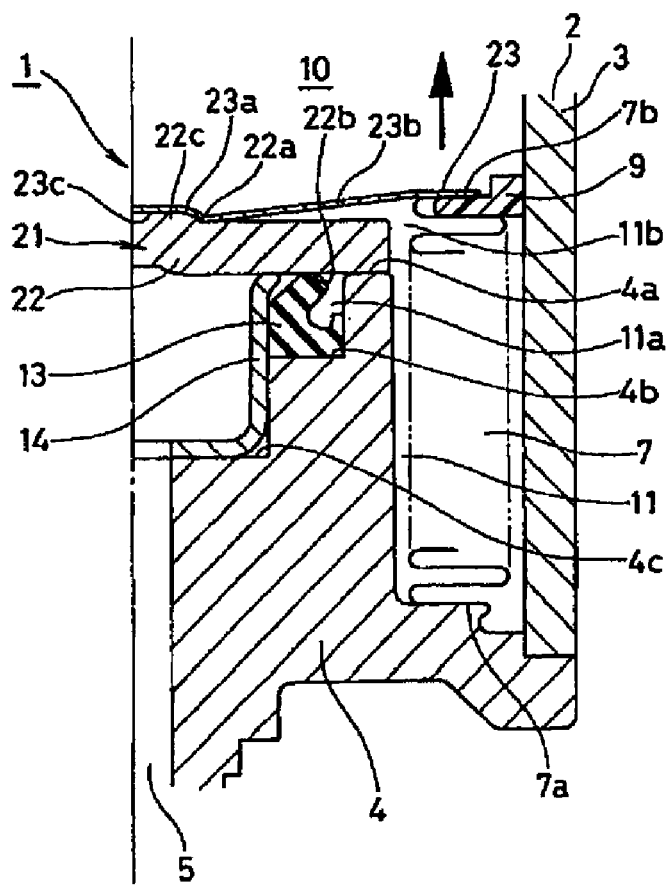
FIG. 3 is a sectional view of a substantial part showing a state at a thermally expanding time in the zero-down state of the accumulator.

FIGS. 1 to 3 show sections of a substantial part of an accumulator 1 in accordance with an embodiment of the present invention. FIG. 1 shows a state at a time of a steady operation, FIG. 2 shows a state at a time of zero-down, and FIG. 3 shows a state at a time of a thermal expansion in the zero-down state, respectively.

The accumulator 1 in accordance with the embodiment is a metal bellows type accumulator in which a metal bellows is used as a bellows 7, and is structured as follows.

First of all, it is provided with an accumulator housing 2 having an oil port 4 connected to a pressure piping (not shown), the bellows 7 is arranged in an inner portion of the housing 2, and an internal space of the housing 2 is comparted into a gas chamber 10 in which a high pressure gas is charged and a liquid chamber 11 communicating with a port hole 5 of the oil port 4. As the housing 2, there is illustrated a housing constructed by a combination of a bottomed cylindrical shell 3, and the oil port 4 fixed to an opening portion of the shell 3, however, a parts layout structure of the housing 2 is not particularly limited. For example, a bottom portion of the shell 3 may be constructed by an end cover which is independent from the shell, and in any case, the bottom portion of the shell 3 or a corresponding part is provided with a gas filler port (not shown) for filling the gas in the gas chamber 10.

The bellows 7 is structured such that a fixed end 7a thereof is fixed to an inner surface of a flange portion of the oil port 4 corresponding to a port side inner surface of the housing 2. Accordingly, the accumulator 1 is constructed as an outside gas type accumulator in which the gas chamber 10 is arranged in an outer peripheral side of the bellows 7, and a liquid chamber 11 is arranged in an inner peripheral side of the bellows 7. Further, a vibration damping ring 9 is attached to an outer peripheral portion of the floating end 7b of the bellows 7 for preventing the bellows 7 from coming into contact with the inner surface of the housing 2.

Annular first and second step portions 4b and 4c are sequentially formed in an inner side of the port hole 5, that is, an inner surface (an upper surface in the figure) of the oil port 4 so as to be positioned in an inner peripheral side of an annular stopper projection (seat surface) 4a, and a seal 13 is fitly attached to the first step portion 4b, and is held by a seal holder 14 fitly attached to the second step portion 4c so as to be prevented from coming off. The seal 13 is structured such as to close the liquid chamber (a space between the bellows 7 and the seal 13) at a time of zero-down of the accumulator 1 so as to seal apart of liquid in this liquid chamber 11, and is formed by a rubber-like elastic body packing provided with an outward seal lip for sufficiently achieving this function. In this case, as the seal 13, an O-ring, an X-ring or the like may be employed as far as a sufficient seal performance can be obtained, and the present invention does not particularly limit the shape of the seal 13.

Further, the accumulator 1 is provided with a pressure difference regulation mechanism 21 for reducing a pressure difference generated at a time when the liquid sealed in the liquid chamber 11 and the charged gas are thermally expanded at a time of zero-down.

The pressure difference regulation mechanism 21 is structured as follows.

A seal plate (called also as a movable plate) 22 is arranged in an inner peripheral side of the floating end 7b of the bellows in such a manner as not to come into contact with the floating end 7b of the bellows, an elastically deformable thin plate (called also as a thin plate shaped cap) 23 is bonded to a surface (an upper surface in the figure) at the gas chamber 10 side of the seal plate 22, an outer diameter of the thin plate 23 is set to be larger than an outer diameter of the seal plate 22, and an outer peripheral portion of the thin plate is bonded to the floating end 7b of the bellows all over a whole periphery. Since the seal plate 22 and the bellows 7 do not interfere with each other, both the elements 7 and 22 are made relatively displaceable in a bellows expanding and contracting direction (a vertical direction in the figure) within a range in which the thin plate 23 is elastically deformed.

The seal plate 22 is formed in a disc shape by a rigid material such as a metal or the like. Thin plate 23 is formed in a disc shape by a thin plate shaped metal, resin or rubber-like elastic material, and the outer diameter thereof is set to be larger than the outer diameter of the seal plate 22 as mentioned above. Further, the thin plate 23 is bonded to the surface at the gas chamber 10 side of the seal plate 22, however, a bonded portion 23a is made only in a center portion on the plane, and a position at an outer periphery side from the bonded portion 23a is a non-bonded portion 23b which is not bonded to the seal plate 22. Further, together with this, at a time of zero-down as shown in FIG. 2, a distance d1 in a radial direction from an outer peripheral edge portion of the seal plate 22 to a thin plate bonded portion 22a is set to be larger than a distance d2 in a radial direction from the outer peripheral edge portion of the seal plate 22 to a seal contact portion 22b (d1>d2), in a state in which the seal plate 22 is in contact with the seal 13.

Figure 4:
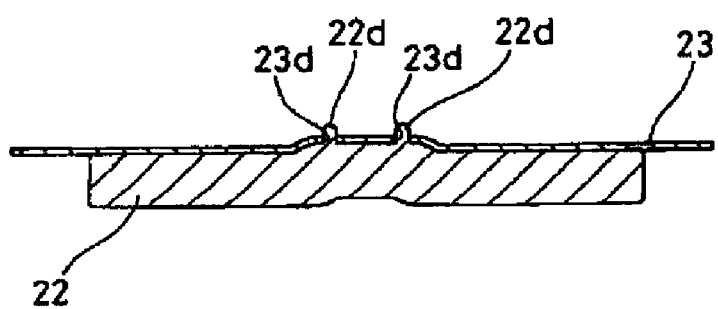
FIG. 4 is a sectional view showing a weld structure of a seal plate and a thin plate.

Further, in the surface at the gas chamber 10 side of the seal plate 22, a convex portion 22c is provided in the center portion on the plane, a concave portion 23c is provided in a center portion on the plane of the thin plate 23 in correspondence to the convex portion 22c, and a positioning in a radial direction of both the elements 22 and 23 is facilitated on the basis of an engagement between the convex portion 22c and the concave portion 23c. Further, a joint between the thin plate 23 and the seal plate 22 is achieved by a bonding means such as a welding, an adhesive bonding or the like, however, in the case of the welding, if welding projections 22d are provided on the seal plate 22 as shown in FIG. 4, and the welding is carried out after inserting them to hole portions 23d provided in the thin plate 23, it is possible to reinforce the joint between both the elements 22 and 23.

Since the fixed end 7a of the bellows is fixed to the inner surface of the flange portion of the oil port 4 corresponding to the inner surface at the port side of the housing 2, the accumulator 1 structured as mentioned above belongs to an outside gas type category, and operates as follows on the basis of the construction mentioned above.

At a Time of Stationary Operation

FIG. 1 shows a state at a time of a steady operation of the accumulator 1. The oil port 4 is connected to a pressure piping of a device (not shown). In this stationary state, since the seal plate 22 stays away from the seal 13 in a state in which it is held to the thin plate 23 and the bellows 7, the port hole 5 and the liquid chamber 11 communicate. Accordingly, since the liquid provided with pressure each time is introduced to the liquid chamber 11 from the port hole 5, the thin plate 23 and the seal plate 22 move while expanding and contracting the bellows 7 in such a manner that the liquid pressure and the gas pressure balance with each other.

At a Time of Zero-Down

If the operation of the device stops from the state in FIG. 1, the liquid within the liquid chamber 11 is discharged little by little from the port hole 5, the bellows 7 is contracted little by little by the charged gas pressure together with this, and the thin plate 23 and the seal plate 22 move little by little in a bellows contracting direction (in a downward direction in the figure), whereby the seal plate 22 comes into contact with the seal 13. As shown in FIG. 2, the seal plate 22 stops by coming into contact with the stopper projection 4a. If the seal plate 22 is in contact or comes into contact with the seal 13 and the stopper projection 4a as mentioned above, the liquid chamber (the space between the bellows 7 and the seal 13) 11 is closed and a part of liquid is sealed in this liquid chamber 11. Accordingly, any further pressure reduction is not generated in this liquid chamber 11, so that the liquid pressure balances with the gas pressure inside and outside the bellows 7. Therefore, it is possible to suppress an abnormal deformation of the bellows 7 caused by the zero-down.

At a Time of Thermal Expansion in Zero-Down State

If the liquid sealed in the liquid chamber 11 and the charged gas are respectively thermally expanded due to an increase of an ambient temperature or the like in a zero-down state in FIG. 2, that is, in a state in which the seal plate 22 comes into contact with the seal 13 and the stopper projection 4a, the pressure difference is generated since a degree of increase of the pressure is greater in the liquid than in the gas. However, since the elastically deformable thin plate 23 constructs a part of the partition wall of the liquid chamber 11, in the accumulator 1, the thin plate 23 is elastically deformed in such a manner as to expand a volumetric capacity of the liquid chamber 11 as shown in FIG. 3 if the pressure difference is generated, and the floating end 7b of the bellows also moves in the bellows expanding direction (the bellows 7 is expanded), and stops at a position at which the liquid pressure balances with a gas pressure. Therefore, since it is possible to inhibit the great pressure difference from being generated inside and outside the bellows 7, it is possible to prevent the abnormal deformation from being generated in the bellows 7 due to the pressure difference.

In addition, at this time, since the distance d1 in the radial direction from the outer peripheral edge portion of the seal plate 22 to the thin plate bonded portion 22a is set to be larger than the distance d2 in the radial direction from the outer peripheral edge portion of the seal plate 22 to the seal contact portion 22b as mentioned above (d1>d2), the seal plate 22 is kept being pressed to the seal 13 and the stopper projection 4a by the pressure in the inner portion of the liquid chamber 11, due to the difference between the upper and lower pressure receiving areas. Accordingly, the zero-down state is not dissolved.

Therefore, in accordance with the accumulator 1 mentioned above, since it is possible to reduce the pressure difference generated at a time when the liquid sealed in the liquid chamber 11 and the charged gas are respectively thermally expanded at a time of the zero-down, in the outside gas type accumulator, it is possible to reduce the pressure difference inside and outside the bellows 7, and it is possible to prevent the abnormal deformation from being generated in the bellows 7. Accordingly, it is possible to improve a durability of the bellows 7, and thus a durability of the accumulator 1.

Figure 5:
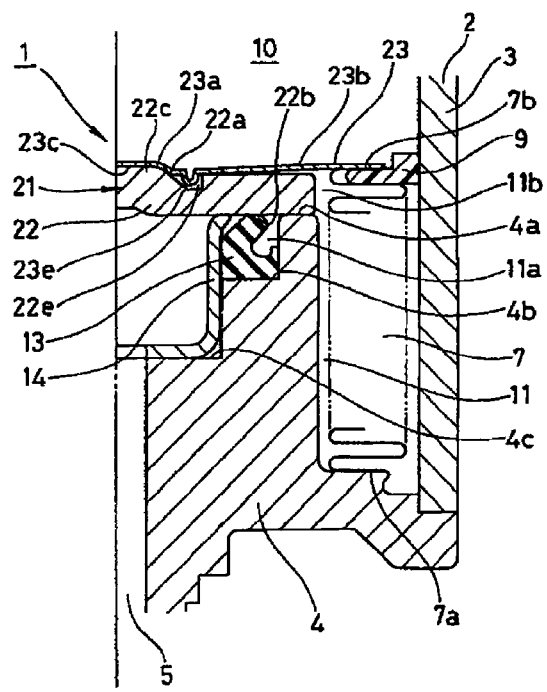
FIG. 5 is a sectional view of a substantial part of an accumulator in accordance with an other embodiment of the present invention.

In this case, in the embodiment mentioned above, the thin plate 23 is formed in the flat plate shape at the other positions than the bonded portion 23a in the center of the plane, however, there can be considered that an annular bent portion 23e is provided at a position at an outer peripheral side of the bonded portion 23a as shown in FIG. 5. Since the thin plate 23 tends to be elastically deformed if the bent portion 23e is provided as mentioned above, it is possible to increase an amount of deformation of the thin plate 23. Further, a load caused by the deformation is hardly transmitted to the bonded portion 23a at a time when the thin plate 23 is elastically deformed, there can be obtained such an effect that the bonded portion 23a is hardly peeled off. The bent portion 23e is formed in a U-shape in a cross section, and a groove-like concave portion 22e for receiving this is provided in the seal plate 22.

Figure 6:
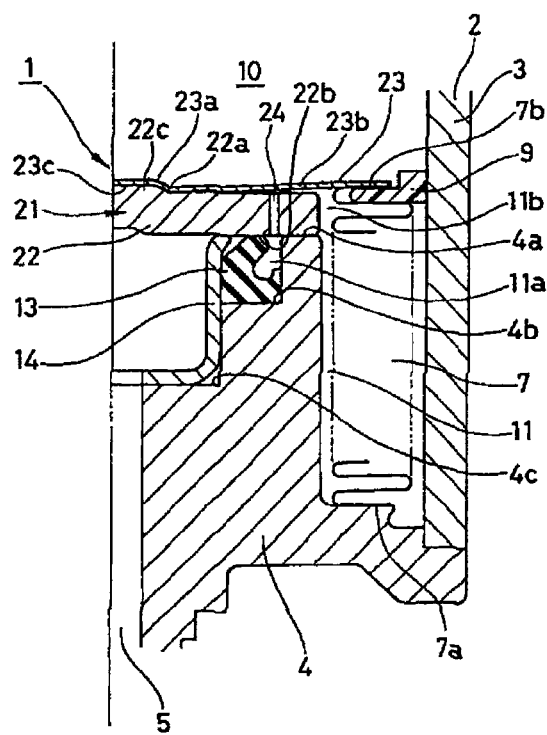
FIG. 6 is a sectional view of a substantial part of an accumulator in accordance with an other embodiment of the present invention.
Figure 7:
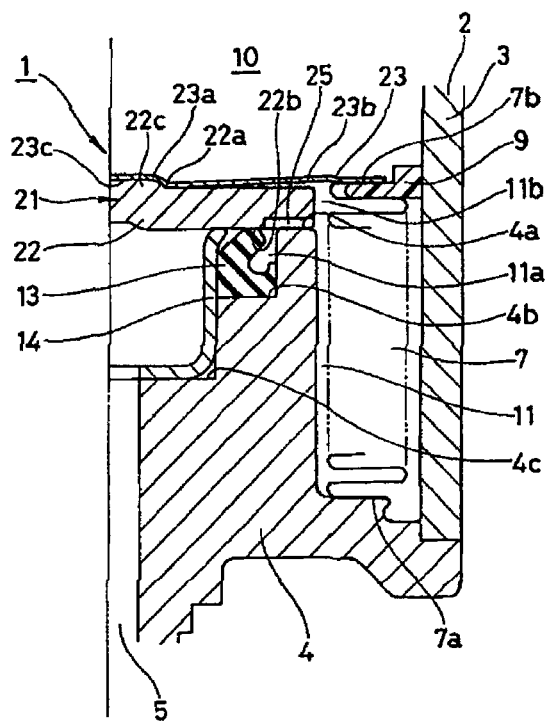
FIG. 7 is a sectional view of a substantial part of an accumulator in accordance with an other embodiment of the present invention.
Figure 8:
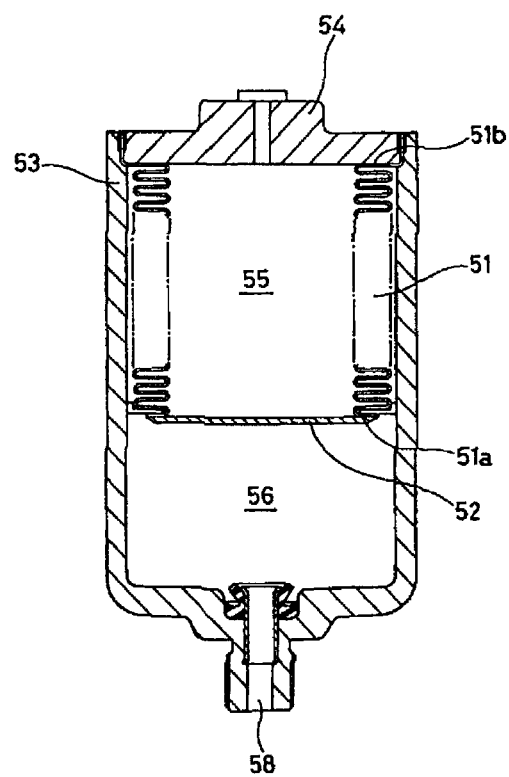
FIG. 8 is a sectional view of an accumulator in accordance with a conventional art.
Figure 9:
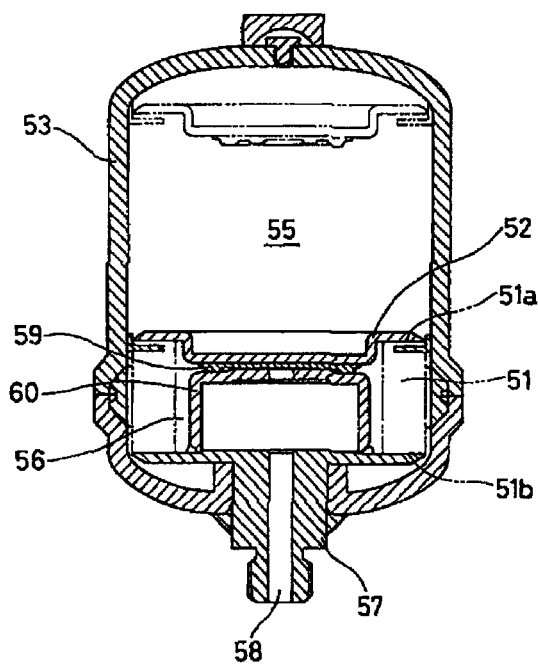
FIG. 9 is a sectional view of an accumulator in accordance with an other conventional art.
Figure 10:
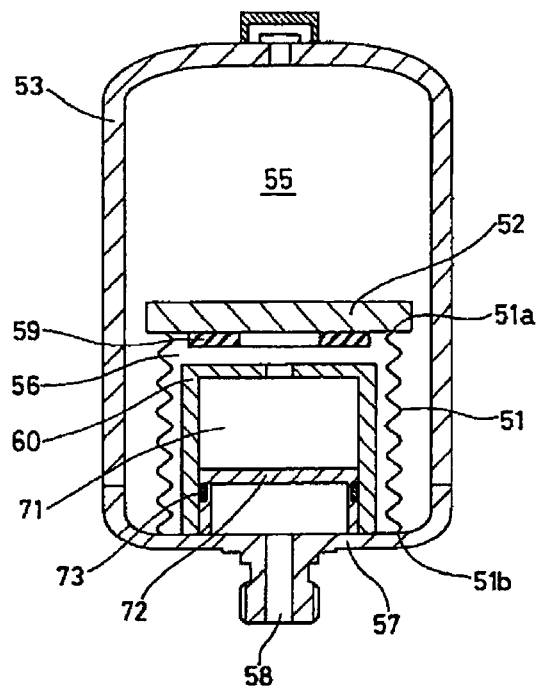
FIG. 10 is a sectional view of an accumulator in accordance with an other conventional art.

Further, in the zero-down state shown in FIG. 2, if the seal plate 22 comes into contact with the stopper projection 4a, there is a case that the space 11a surrounded by the seal plate 22, the stopper projection 4a and the seal 13 is sealed, and if the liquid within the sealed space 11a is thermally expanded, there is a risk that the seal 13 is damaged by being exposed to high pressure. Accordingly, in order to prevent this, it is preferable to make the space 11a communicate with the liquid chamber 11 (the space 11b surrounded by the bellows 7, the oil port 4, the seal plate 22 and the thin plate 23) by providing a through hole shaped communication path 24 in the seal plate 22 as shown in FIG. 6, or providing a notch shaped communication path 25 in an outer peripheral portion of the seal plate 22 as shown in FIG. 7.

What is claimed is:
1. An accumulator comprising:
    an accumulator housing provided with an oil port connected to a pressure piping; and
    a bellows arranged in an inner portion of said housing to compart an internal space of said housing into a gas chamber in which a high pressure gas is charged and a liquid chamber communicating with a port hole,
    a fixed end of said bellows being fixed to said oil port so as to set an outer peripheral side of said bellows to the gas chamber and to set an inner peripheral side thereof to the liquid chamber, and an inner surface of said oil port being provided with a seal for closing the liquid chamber at a time of zero-down i.e. when the liquid within the liquid chamber is discharged through the port hole and the seal plate comes into contact with the seal, so as to seal a part of the liquid in said liquid chamber, wherein the accumulator has a pressure difference regulation mechanism for reducing a pressure difference generated at a time when the liquid sealed in said liquid chamber and the charged gas are thermally expanded at a time of zero-down, wherein said regulation mechanism is structured such that a seal plate is arranged in an inner peripheral side of a floating end of said bellows, an elastically deformable thin plate is bonded to a surface at the gas chamber side of said seal plate, an outer peripheral portion of said thin plate is bonded to said floating end of the bellows, said seal plate and said floating end of the bellows are made relatively displaceable in a bellows expanding and contracting direction in a range in which said thin plate is elastically deformed, and a distance in a radial direction from an outer peripheral edge portion of said seal plate to the thin plate bonded portion is set to be larger than a distance in a radial direction from an outer peripheral edge portion of said seal plate to a seal contact portion, i.e. a portion where the seal plate comes into contact with the seal, in a state in which said seal plate comes into contact with said seal at a time of zero-down, and wherein said seal plate is away from said seal in a state in which said seal plate is held to said bellows and the thin plate at a time of a steady operation, said seal plate comes into contact with said seal at a time of zero-down, and said thin plate is elastically deformed to a state in which liquid pressure balances with gas pressure while said seal plate being kept in contact with said seal at a time when said liquid and the charged gas are thermally expanded.

* * * * *